Figure 1:
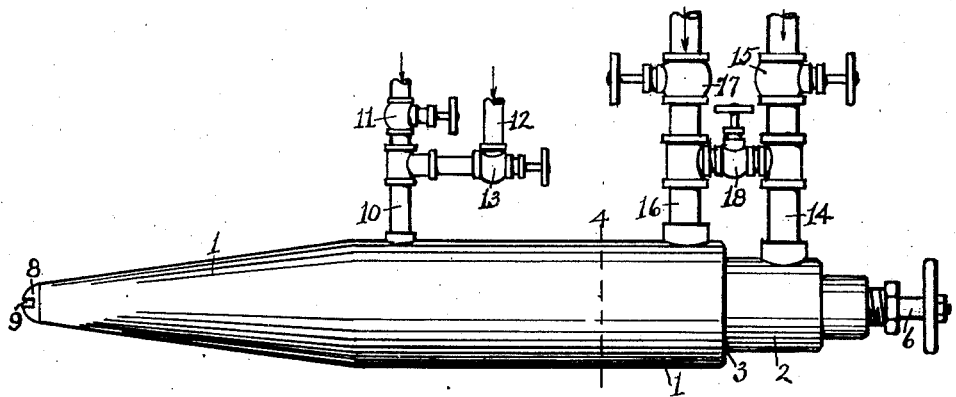

Feb. 9, 1926.

H. W. JAEGER 1,572,653

HYDROCARBON OIL BURNER

Filed March 17, 1925

Hans W. Jaeger, Inventor

By Geo. W. Bullard, Attorney

Patented Feb. 9, 1926.

1,572,653

UNITED STATES PATENT OFFICE.

HANS W. JAEGER, OF TACOMA, WASHINGTON.

HYDROCARBON-OIL BURNER.

Application filed March 17, 1925. Serial No. 16,120.

*To all whom it may concern:*

Be it known that I, HANS W. JAEGER, a citizen of the United States, residing at the city of Tacoma, in the county of Pierce and State of Washington, have invented a new and useful Improvement in Hydrocarbon-Oil Burners, of which the following is a specification.

My invention relates to oil burners in which hydrogen is mixed therewith in the form of superheated steam, and water when necessary, so proportioned as to secure any high degree of heat desired. The object of my invention is to secure complete combustion of the fuel oil, so no residue will be lost in the form of soot or gaseous smoke. Another object of my invention is to so mix the oil with the hydrogen and oxygen gases before contacting the flames, that complete combustion and the desired degree of high heat will be secured.

Figure 2:
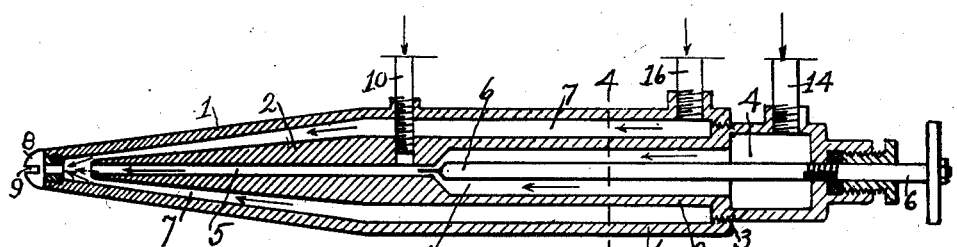
Figure 3:
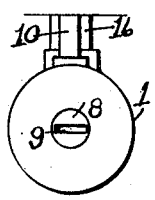
Figure 4:
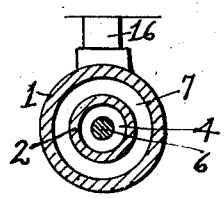

These objects and the benefits derived will be apparent from a reading of the following specification taken in connection with the acompanying drawing wherein the form and operation of the invention is illustrated. In the drawing:

Fig. 1 is a side view of the invention; Fig. 2 is a longitudinal section of the same; Fig. 3 is a view of the left or nozzle end of the invention, and Fig. 4 is a cross section on the line 4—4.

Referring more in detail to the drawing, the body part is cast in two parts, an outer part 1 and an inner part 2 screwed together at 3. The inner part has a central chamber 4 with a discharge outlet 5 controlled by the pin valve 6. Between the outer and inner parts, 1 and 2, is formed an annular chamber 7 terminating at the nozzle outlet into which is threaded a nozzle head 8 with thin fan-shaped outlet 9. This forms the body part of the hydro-carbon oil burner to which the operating parts are attached to complete the operative device.

The fuel oil is supplied through the pipe 10 controlled by valve 11. Water in required proportions is supplied thru pipe 12 controlled by valve 13. The pipe 10 leads into the discharge outlet channel 5. The pipe 14 controlled by valve 15 is used to supply steam or air under high pressure into the chamber 4 and out thru the discharge channel 5, the same being controlled by the pin valve 6. The pipe 16 controlled by valve 17 supplies air into the annular chamber 7. This may be under any desired pressure. A by-pass valve 18 connects pipes 16 and 14, so compressed air may be used when steam is not available or desired.

In operation with all supply pipes in operation, the steam discharging thru the channel 5 vaporizes and mixes the fuel oil and water delivered thru pipe 10 which on passing its outlet receives and mixes with air from the annular chamber 7 prior to being discharged thru the nozzle opening 9. It is to be observed this air will be superheated by the steam passing thru chamber 4 and channel 5, thus making the combustion more effective. The elements of combustion being thus vaporized and thoroly mixed and discharged thru the thin fan-shaped opening 9, on contacting the flames, the combustion is instantaneous and complete. By suitably proportioning the several elements of combustion, any desired degree of high heat can be produced. The combustion is complete and clean and free of soot or odors.

The objects desired are thus obtained by thoroly vaporizing and mixing the elements of combustion within the body of the hydrocarbon oil burner before discharging into a furnace or other combustion chamber.

The invention is designed to be so varied in form and size as to meet any condition or requirements. The mechanical construction is common to the arts of manufacture but the invention is novel in process and operation.

Having described my invention, I claim:

In a hydro-carbon oil burner comprising inner and outer body parts, a lengthened cylindrical steam receiving chamber within said inner body part, a valve controlled steam and air pipe into said chamber, a valve controlled tubular nozzle outlet from said steam chamber, a valve controlled oil and a valve controlled water supply into said tubular nozzle outlet, an annular air receiving channel and nozzle between said inner and outer body parts, a valve controlled air pipe into said annular air channel and nozzle, and said annular air nozzle adjacent to and surrounding the tubular nozzle outlet from said steam chamber, at which joint all the elements of combustion will be vaporized, heated, and mixed, prior to passing through the discharging nozzle of said oil burner.

HANS W. JAEGER.